No. 754,398. PATENTED MAR. 8, 1904.
G. S. TIFFANY.
TORSIONAL PENDULUM FOR CLOCKS.
APPLICATION FILED DEC. 12, 1903.
NO MODEL.

WITNESSES
INVENTOR
Attorney

No. 754,398. Patented March 8, 1904.

UNITED STATES PATENT OFFICE.

GEORGE STEELE TIFFANY, OF BROOKLYN, NEW YORK, ASSIGNOR OF ONE-HALF TO JAMES VAN INWAGEN, OF CHICAGO, ILLINOIS.

TORSIONAL PENDULUM FOR CLOCKS.

SPECIFICATION forming part of Letters Patent No. 754,398, dated March 8, 1904.

Original application filed November 30, 1901, Serial No. 84,287. Divided and this application filed December 12, 1903. Serial No. 184,921. (No model.)

*To all whom it may concern:*

Be it known that I, GEORGE STEELE TIFFANY, a citizen of the United States of America, and a resident of the borough of Brooklyn, in the city of New York, in the county of Kings, in the State of New York, have invented certain new and useful Improvements in Torsional Pendulums for Clocks, of which the following is a specification.

This invention relates to torsional pendulums, which are especially useful in electric clocks because the period of each beat is much longer than the beat of the ordinary swinging pendulum and less current is required to impulse them, the current being used only during a minute fraction of each beat. These pendulums are also useful in spring-actuated clocks, tending to prolong the running thereof between the windings.

The objects of the invention are to provide a torsional pendulum easily and accurately adjustable to regulate the length of the beat and self-compensating to adapt itself to variations in temperature.

The invention consists principally in a compensating pendulum comprising a torsional pendulum-rod having a lateral extension provided with a stop, preferably adjustable on the extension, a weight of solid metal on said extension, and automatic means for holding said weight in contact with said stop, the weight and extension having different expansibilities under a varying temperature, which adapt them to act automatically by expansion and contraction to shorten the radial distance between the weight and the axis of the rod as the extension expands and to increase said radial distance as the extension contracts.

The invention consists, further, in certain structural features hereinafter explained.

Figure 1:
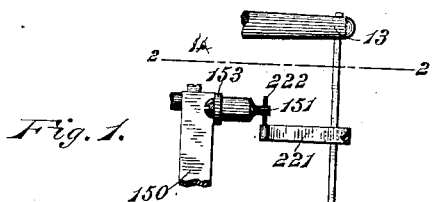
Figure 2:
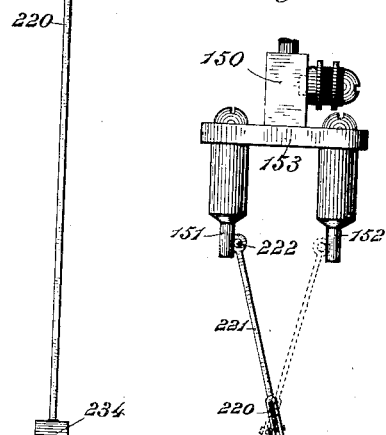
Figure 3:
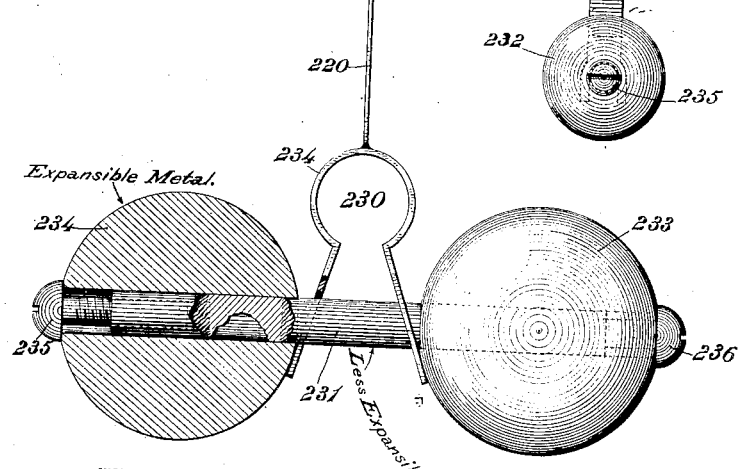

Figure 1 of the accompanying drawings represents a side elevation of a torsional pendulum embodying one form of this invention, together with parts of an actuating mechanism therefor. Fig. 2 represents a transverse section thereof on line 2 2 of Fig. 1 looking downward. Fig. 3 represents, on an enlarged scale, a front elevation, partly in section, of the lower portion of the torsional pendulum.

The same reference-numbers indicate corresponding parts in all of the figures.

In my application, Serial No. 84,287, filed November 30, 1901, for a patent for an improvement in electric clocks I have shown the pendulum herein described embodied in the clock set forth therein, and this case is a division of said application. The drawings hereto annexed illustrate the connection of this pendulum with the actuating mechanism of the electric clock illustrated in said original application.

In the form of embodiment herein shown a torsional pendulum support or rod 220 is designed to be suspended from the pendulum-post, as 13, of the clock to which it is applied, and a pendulum-bob 230, whose arc of oscillation is horizontal, is secured to the lower end of said torsional rod. The pendulum-rod is preferably composed of a flat elastic metallic strip of wire or strands of wire or any other material and in any other shape adapted to receive and resist a torsional force. When the pendulum is designed for use on an electric clock, the pendulum-rod has means for completing an electric circuit through its main body or otherwise, and in such a case it may be provided with a contact-arm, as 221, secured at one end to said rod and projecting at the other end between contact-studs, as 151 and 152, supported, for example, on a plate, as 153, attached to an armature, as 150. As the pendulum-rod oscillates the arm 221 touches one or the other of said contacts, preferably by means of an upright stud 222, secured to the free end thereof.

The pendulum-bob 230, suspended from the pendulum-rod, comprises a horizontal coupling-bar 231, which constitutes lateral extensions in two directions of the pendulum-rod, stops 235 and 236 on said bar, weights 232 and 233 on said bar between said stops, and a spring-clip 234, suspended from the pendulum-rod and operative to hold the weights against the stops and permit them to expand toward each other. The weights are preferably spherical in form and provided with diametrical holes in which the opposite ends of the bar enter. These weights are preferably adjustable on the coupling-bar to regulate the torsional beat of the pendulum and to compensate for variations in the elasticity of the torsional support due to changes in temperature. Any suitable means of adjustment may be employed. The means shown consist of the stops 235 and 236 in the form of adjusting-screws which engage screw-threaded holes in the end of the bar, their heads serving as the stops for the weights. These adjusting-screws render the coupling-bar extensible. The spring-clip 234 is preferably in the form of an expanding fork, which may be considered as a downward or forked extension of the pendulum-rod, serving as a means of connecting the coupling-bar therewith. The coupling-bar extends through holes in the legs of the fork and the latter bear against the weights and hold them apart from each other in contact with the stops 235 and 236. Any suitable means for this purpose may be employed. The pendulum is regulated to increase the speed of its beats by adjusting the weights nearer together and to decrease the frequency of its oscillations by moving them farther apart. This adjustment is readily effected by means of said adjusting screws or stops. To avoid variations due to changes in temperature and to secure uniform action of the pendulum, the parts of the bob are so constructed as to compensate for such differences. The coupling-bar 231 is composed of a material which expands less for a given increase in temperature than the material of which the weights are composed. For instance, the coupling-bar may be composed of steel, which has a comparatively low expansibility, and the weights of an alloy of lead, which has a comparatively high coefficient of expansion. An increase of temperature will cause an expansion of the coupling-bar and weights, and the expansion of the coupling-bar will tend to move the weights apart; but the greater expansion of the weights operating against the stops will tend to decrease the distance between them and the radial distance of each from the axis of rotation of the pendulum-rod. The relative dimensions and expansions of these elements, respectively, are such that as the coupling-bar extends outwardly the weights expand inwardly the required extent to maintain the normal relation between the weights and bar, and as the parts contract on a lowering of temperature and the weights shrink in greater ratio than the coupling-bar the spring-clip holds the weights against the stops and the weights are thereby separated from each other or moved farther from the center of oscillation. The parts of the pendulum may be so proportioned as to compensate for variations in the length or stiffness of the torsional wire due to variations in temperature.

I claim as my invention—

1. A compensating pendulum comprising a pendent torsional rod having a lateral extension provided with a stop, a weight of solid metal on said extension, the weight and extension having different expansibilities adapting them to act automatically by expansion and contraction to vary the radial distance between the weight and the axis of the rod to compensate for the contraction and expansion of the extension, and automatic means for holding said weight in contact with said stop.

2. A compensating pendulum comprising a pendent torsional rod having a lateral extension provided with an adjustable stop, a weight of solid metal on said extension, the weight and extension having different expansibilities adapting them to act automatically by expansion and contraction to vary the radial distance between the weight and the axis of the rod to compensate for the contraction and expansion of the extension, and automatic means for holding said weight in contact with said stop.

3. A compensating pendulum comprising a pendent torsional rod, a coupling-bar connected with said rod and provided with adjustable stops, weights on said coupling-bar between said stops, and resilient means operative to hold said weights in contact with said stops and permit them to expand toward each other, the weights and bar being of different solid metals and the metal of the weights being more sensitive to the changes of temperature than the metal of the bar, and adapted by expansion and contraction to compensate for the expansion and contraction of the coupling-bar.

4. A compensating pendulum comprising a pendent torsional rod, a spring-clip attached thereto, a coupling-bar supported by said spring-clip, and weights adjustable on said coupling-bar between said clip and stops.

5. A compensating pendulum comprising a pendent torsional rod, a spring-clip attached thereto, a coupling-bar supported by said spring-clip and provided with stops at its opposite ends, and weights on said coupling-bar between said clip and stops.

6. A compensating pendulum comprising a pendent torsional rod, a spring-clip attached thereto, a coupling-bar supported by said spring-clip and provided with adjustable stops at its opposite ends, and weights adjustable on said coupling-bar between said clip and stops.

7. A compensating pendulum comprising a pendent torsional rod, a coupling-bar connected with said rod, weights adjustable on said coupling-bar between said clip and stops, and a spring means for holding said weights against said stops.

8. A compensating pendulum comprising a pendent torsional rod, a spring-clip attached thereto, a coupling-bar supported by said spring-clip and provided with stops, and weights on said coupling-bar between said clip and stops, the weights and bar being of different metals, the metal of the weights being more sensitive to changes of temperature than the metal of the bar, whereby the pendulum is self-compensating.

GEORGE STEELE TIFFANY.

Witnesses:
HENRY EDWARD DAWSON,
R. A. DE LA MATES.